United States Patent
Abedini et al.

(10) Patent No.: US 11,716,185 B2
(45) Date of Patent: Aug. 1, 2023

(54) TECHNIQUES FOR QUASI CO-LOCATION (QCL) INDICATION IN AN INTEGRATED ACCESS AND BACKHAUL (IAB) SYSTEM

(71) Applicant: QUALCOMM Incorporated, San Diego, CA (US)

(72) Inventors: Navid Abedini, Somerset, NJ (US); Jianghong Luo, Skillman, NJ (US); Tao Luo, San Diego, CA (US); Luca Blessent, Whitehouse Station, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/125,550

(22) Filed: Dec. 17, 2020

(65) Prior Publication Data
US 2021/0194657 A1    Jun. 24, 2021

Related U.S. Application Data

(60) Provisional application No. 62/951,917, filed on Dec. 20, 2019.

(51) Int. Cl.
*H04L 5/00* (2006.01)
(52) U.S. Cl.
CPC .......... *H04L 5/0053* (2013.01); *H04L 5/0048* (2013.01)
(58) Field of Classification Search
CPC ............................ H04L 5/0053; H04L 5/0048
See application file for complete search history.

(56) References Cited

U.S. PATENT DOCUMENTS

| | | | | |
|---|---|---|---|---|
| 2019/0349036 A1* | 11/2019 | Wang | ................ | H04W 56/0045 |
| 2019/0394738 A1* | 12/2019 | Abedini | ............ | H04W 74/0833 |
| 2020/0044732 A1* | 2/2020 | Cui | ........................ | H04W 88/10 |
| 2020/0229271 A1* | 7/2020 | You | ...................... | H04W 56/001 |
| 2021/0045170 A1* | 2/2021 | Luo | ........................ | H04W 88/14 |
| 2021/0051768 A1* | 2/2021 | Li | ...................... | H04W 72/1257 |
| 2021/0120517 A1* | 4/2021 | Akkarakaran | ........ | H04W 88/08 |

FOREIGN PATENT DOCUMENTS

| | | |
|---|---|---|
| EP | 3754886 A1 | 12/2020 |
| WO | 2019196870 A1 | 10/2019 |
| WO | WO-2021112747 A1 * | 6/2021 |

OTHER PUBLICATIONS

International Search Report and Written Opinion—PCT/US2020/066149—ISA/EPO—dated Apr. 19, 2021.

* cited by examiner

*Primary Examiner* — Duc C Ho
(74) *Attorney, Agent, or Firm* — Arent Fox, LLP

(57) ABSTRACT

Aspects described herein relate to quasi co-location (QCL) indications in an integrated access and backhaul (IAB) system. In an example, an IAB node may determine a spatial relation between a first communication of a DU entity and a second communication of one of the DU entity or a co-located MT entity. The IAB node may further configure a beam of at least one of the MT or the DU based on the determined spatial relation. The IAB node may further communicate using the beam with at least one entity.

30 Claims, 7 Drawing Sheets

TECHNIQUES FOR QUASI CO-LOCATION (QCL) INDICATION IN AN INTEGRATED ACCESS AND BACKHAUL (IAB) SYSTEM

CROSS-REFERENCE TO RELATED APPLICATION(S)

This application claims the benefit of U.S. Provisional Application Ser. No. 62/951,917, entitled "TECHNIQUES FOR QUASI CO-LOCATION (QCL) INDICATION IN AN INTEGRATED ACCESS AND BACKHAUL (IAB) SYSTEM" and filed on Dec. 20, 2019, which is expressly incorporated by reference herein in its entirety.

BACKGROUND

Aspects of the present disclosure relate generally to wireless communication systems, and more particularly, to bi-direction preemption indication transmissions.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, full duplex communication with respect to integrated access and backhaul (IAB) implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at an integrated access and backhaul (IAB) node is provided. The method may include determining a spatial relation between a first communication of a distributed unit (DU) entity and a second communication of one of the DU entity or a co-located mobile termination (MT) entity, configuring a beam of at least one of the MT or the DU based on the determined spatial relation, and communicating using the beam with at least one entity.

A further example implementation includes an apparatus for wireless communications comprising a memory and at least one processor in communication with the memory. The at least one processor may be configured to determine a spatial relation between a first communication of a DU entity and a second communication of one of the DU entity or a co-located MT entity. The at least one processor may further be configured to configure a beam of at least one of the MT or the DU based on the determined spatial relation. The at least one processor may be configured to communicate using the beam with at least one entity.

An additional example implementation includes an apparatus for wireless communications. The apparatus may include means for determining a spatial relation between a first communication of a DU entity and a second communication of one of the DU entity or a co-located MT entity. The apparatus may further include means for configuring a beam of at least one of the MT or the DU based on the determined spatial relation. The apparatus may further include means for communicating using the beam with at least one entity.

A further example implementation includes computer-readable medium storing computer code executable by a processor for wireless communications at a network entity comprising code for determining a spatial relation between a first communication of a DU entity and a second communication of one of the DU entity or a co-located MT entity, configuring a beam of at least one of the MT or the DU based on the determined spatial relation, and communicating using the beam with at least one entity.

For example, determining the spatial relation may include determining that an uplink transmission of the MT entity is spatially related to a downlink transmission of the DU entity. In some aspects, configuring the beam includes configuring the uplink transmission of the MT entity with a spatial relation information indication including at least one of a synchronization signal block (SSB) index associated with the DU entity, or a channel state information reference signal (CSI-RS) index associated with the DU entity.

In some aspects, at least one of the SSB index or the CSI-RS index may be associated with different transmission reception points (TRPs) of the DU entity.

In some aspects, the spatial relation information indication further includes an index of an SSB transmitted by the DU entity within an SSB transmission configuration (STC) window.

In some aspects, the index of the SSB corresponds to at least one of a first SSB index with a center frequency or a second SSB index with an STC configuration window.

For example, determining the spatial relation may include determining that a downlink reception of the MT entity is spatially related to a downlink transmission of the DU entity. In some aspects, configuring the beam includes configuring the downlink transmission of the MT entity with a spatial relation information indication including at least one of a SSB index associated with the DU entity, or a CSI-RS index associated with the DU entity.

In some aspects, at least one of the SSB index or the CSI-RS index may be associated with different TRPs of the DU entity.

In some aspects, the spatial relation information indication further includes an index of an SSB transmitted by the DU entity within an SSB transmission configuration (STC) window.

For example, determining the spatial relation may include determining that a first downlink transmission of the DU entity is spatially related to a second downlink transmission of the DU entity or an uplink transmission of the MT entity. In some aspects, configuring the beam includes configuring the first downlink transmission of the DU entity with a spatial relation information indication including at least one of a SSB index associated with the DU entity, or a CSI-RS index associated with the DU entity.

In some aspects, the spatial relation includes receiving a beam configuration indication from a central unit (CU) or a parent IAB entity.

In some aspects, at least one of the SSB index or the CSI-RS index are associated with different TRPs of the DU entity.

In some aspects, the spatial relation information indication further includes at least one of an index of an SSB transmitted by the DU entity within an STC window In some aspects, configuring the beam may include configuring the downlink transmission of the DU entity with a spatial relation information indication including a sounding reference signal (SRS) index of the MT entity.

For example, determining the spatial relation may include determining that an uplink reception of the DU entity is spatially related to a downlink transmission of the DU entity or an uplink transmission of the MT entity. In some aspects, configuring the beam includes configuring the uplink reception of the DU entity with a spatial relation information indication including at least one of a SSB index associated with the DU entity, or a CSI-RS index associated with the DU entity.

In some aspects, determining the spatial relation may include receiving a beam configuration indication from a CU or a parent IAB entity.

In some aspects, at least one of the SSB index or the CSI-RS index may be associated with different TRPs of the DU entity.

In some aspects, the spatial relation information indication further includes at least one of an index of an SSB transmitted by the DU entity within an STC window.

In some aspects, configuring the beam may include configuring the downlink transmission of the DU entity with a spatial relation information indication including a sounding reference signal (SRS) index of the MT entity.

In some aspects, the spatial relation may correspond to a quasi-co-location of the MT entity and the DU entity.

In some aspects, communicating using the beam with at least one entity comprises at least one of the following an uplink transmission by the MT entity, a downlink reception by the MT entity, a downlink transmission by the DU entity, an uplink reception by the DU entity, or measuring one or more signals by one of the MT or DU entities.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
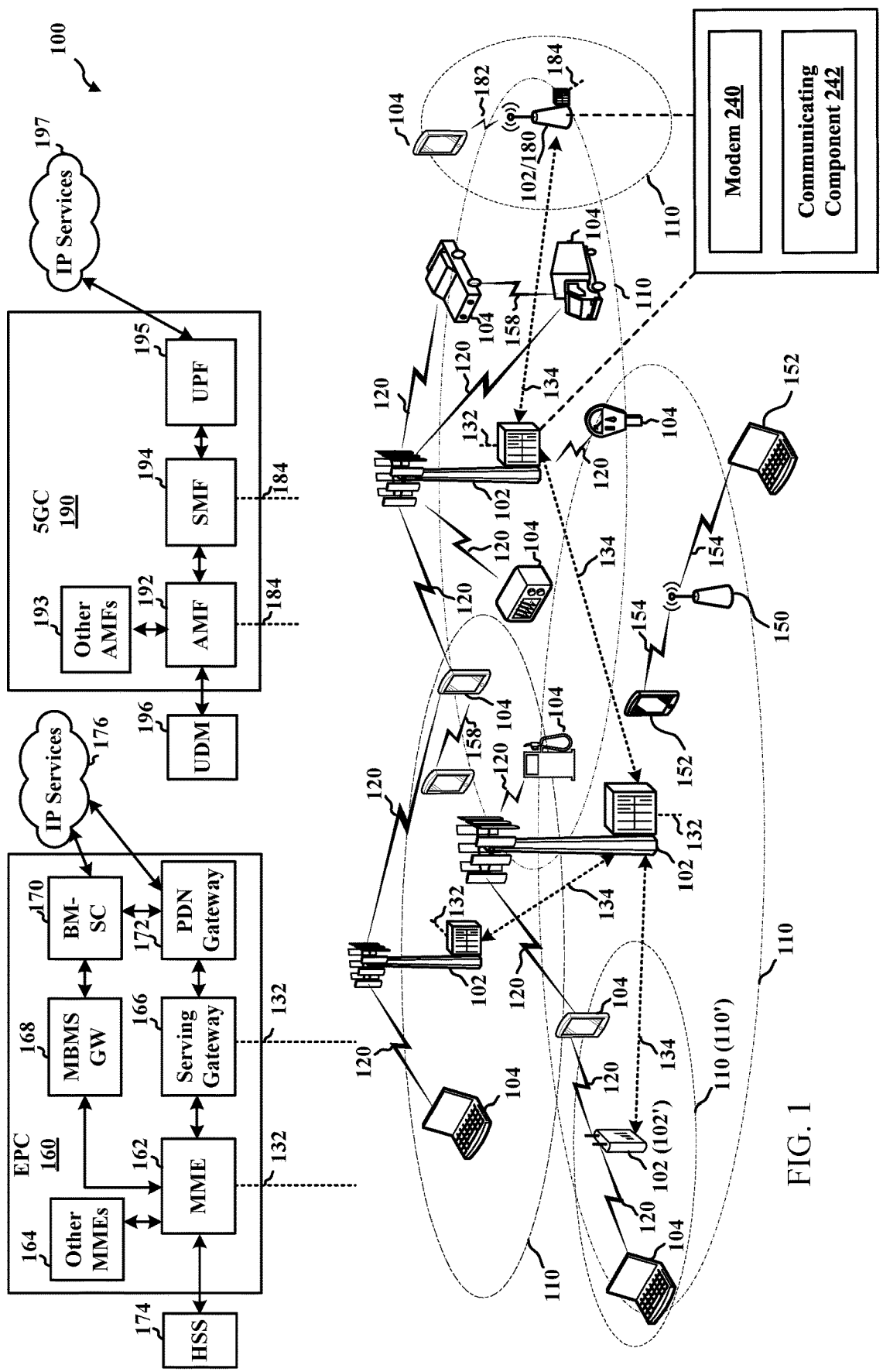
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to quasi co-location (QCL) indications in an integrated access and backhaul (IAB) system. Specifically, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as IAB nodes, where the wireless spectrum may be used both for access links (i.e., wireless links with user equipments (UEs)), and for backhaul links, which may be referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

With respect to QCL, two antenna ports may be considered QCLed if properties of the channel over which a symbol on one antenna port is conveyed can be inferred from the channel over which a symbol on the other antenna port is conveyed. That is, in some aspects, transmissions or receptions from two channels may share similar channel conditions. Accordingly, channel information estimated to detect one channel may assist with detecting the other spatially related channel. As such, it would be desirable to implement such techniques to an JAB system. Specifically, an IAB-node may have one or more mobile terminations (MTs), and one or more distributed units (DUs) (e.g., and each DU has one or more cells/sectors). Each entity (MT and/or cell) may also have one or more transmission/reception points (TRPs). The signals that are transmitted by/received by different entities (e.g., or their TRPs) may be quasi co-located and/or spatially related.

In one implementation, an IAB node may determine a spatial relation between a first communication of a DU entity and a second communication of one of the DU entity or a co-located MT entity. The IAB node may further configure a beam of at least one of the MT or the DU based on the determined spatial relation. The JAB node may further communicate using the beam with at least one entity.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes acting as an IAB node, such as base station 102/gNB 180, may have a modem 240 and communicating component 242 for configuring one or more beams based on QCL indications, as described herein. Though a base station 102/gNB 180 is shown as having the modem 240 and communicating component 242, this is one illustrative example, and substantially any node or type of node acting as an IAB node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an Sl interface).

The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
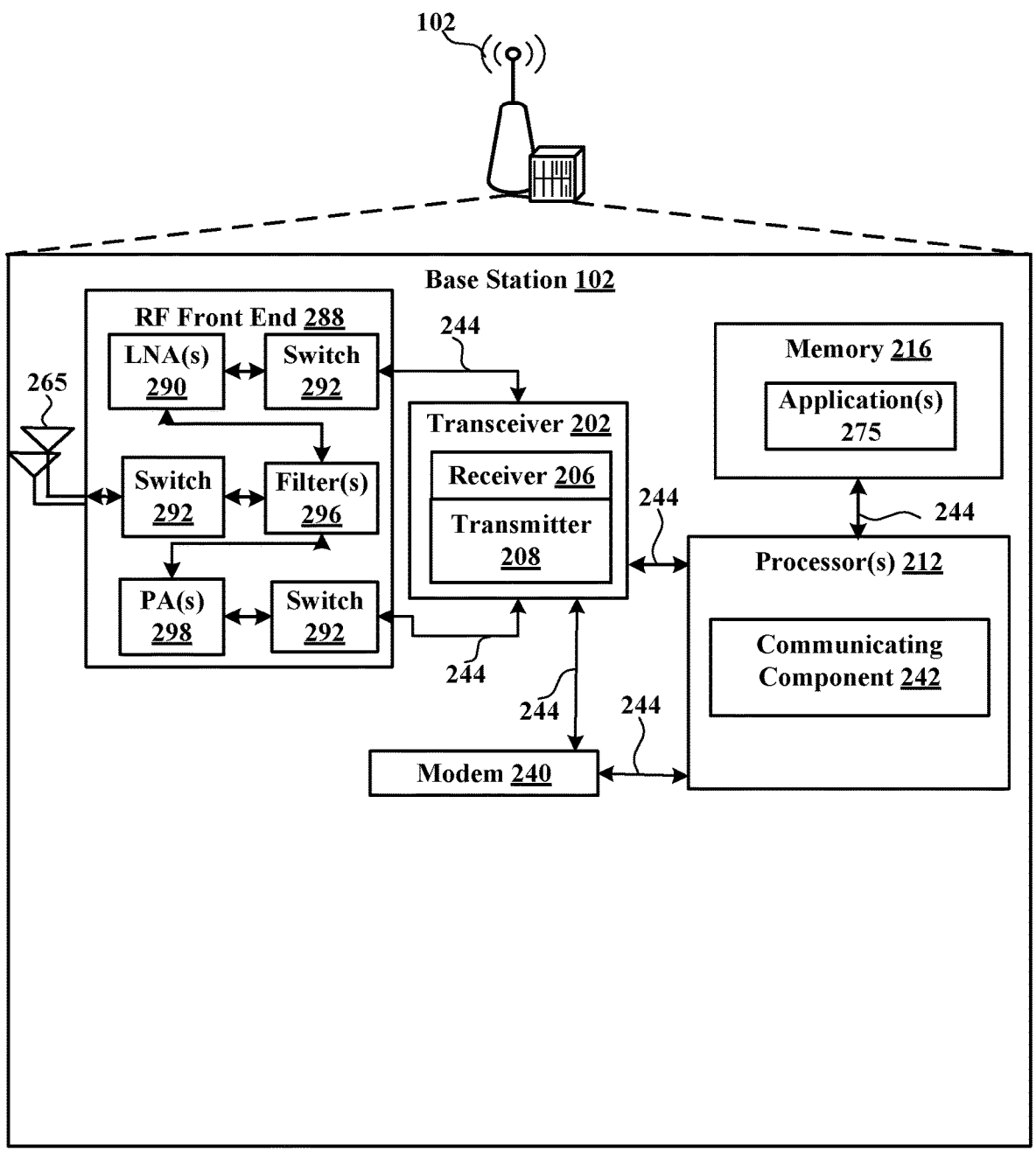
FIG. 2 is a block diagram illustrating an example of a network entity (also referred to as a base station), in accordance with various aspects of the present disclosure.
Figure 3:
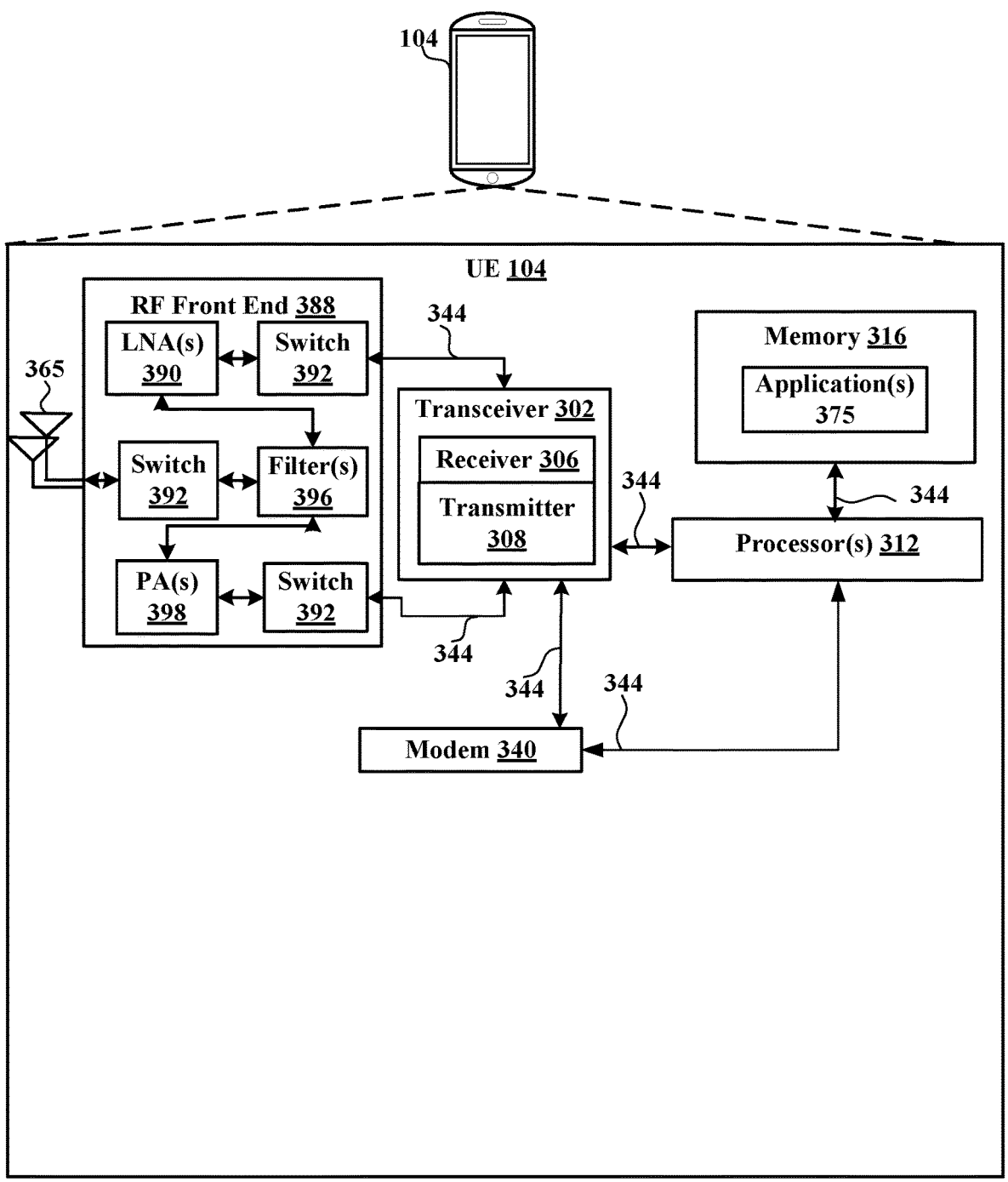
FIG. 3 is a block diagram illustrating an example of a user equipment (UE), in accordance with various aspects of the present disclosure.
Figure 4:
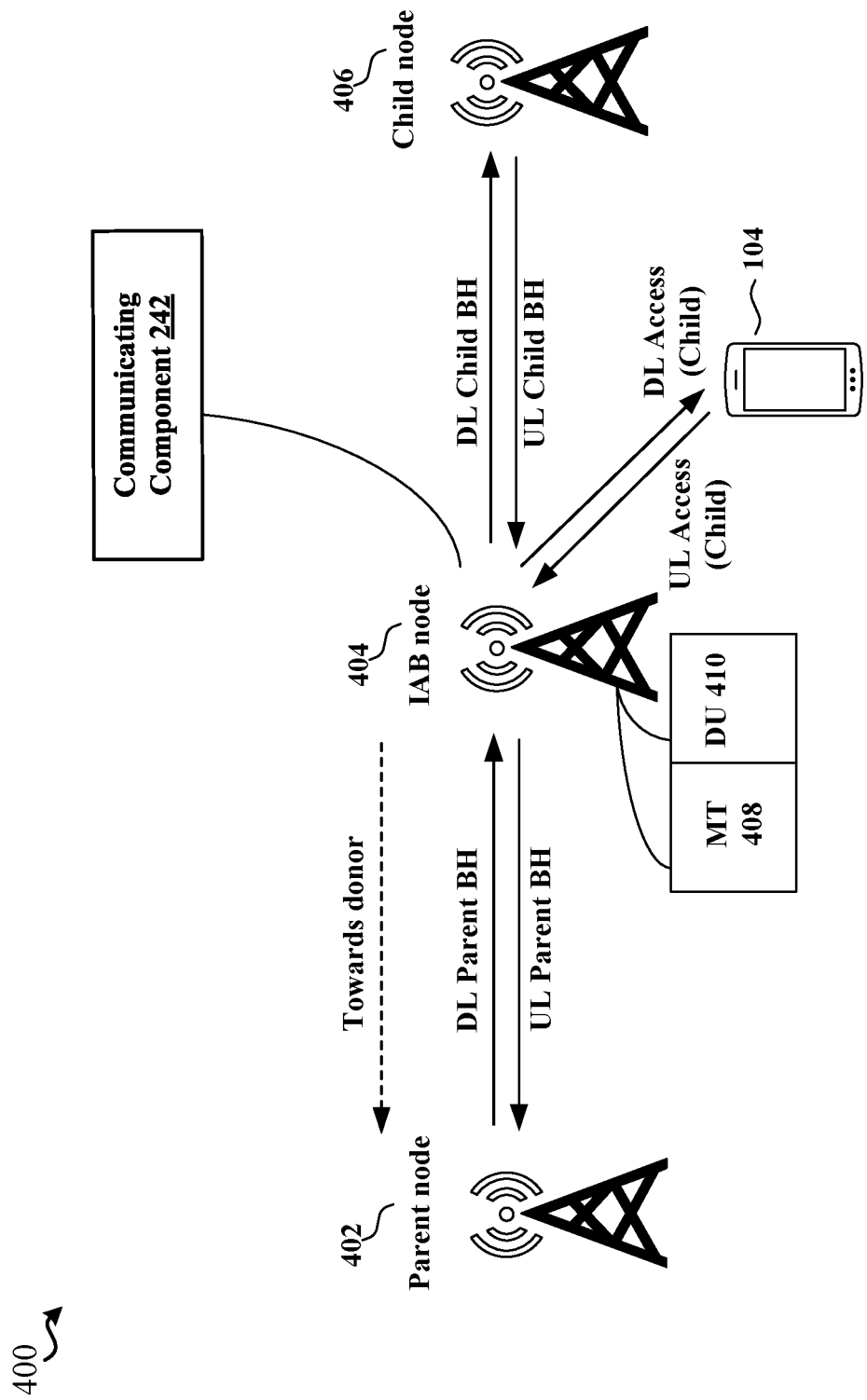
FIG. 4 is a diagram of an example integrated access and backhaul (IAB) system, in accordance with various aspects of the present disclosure.
Figure 5:
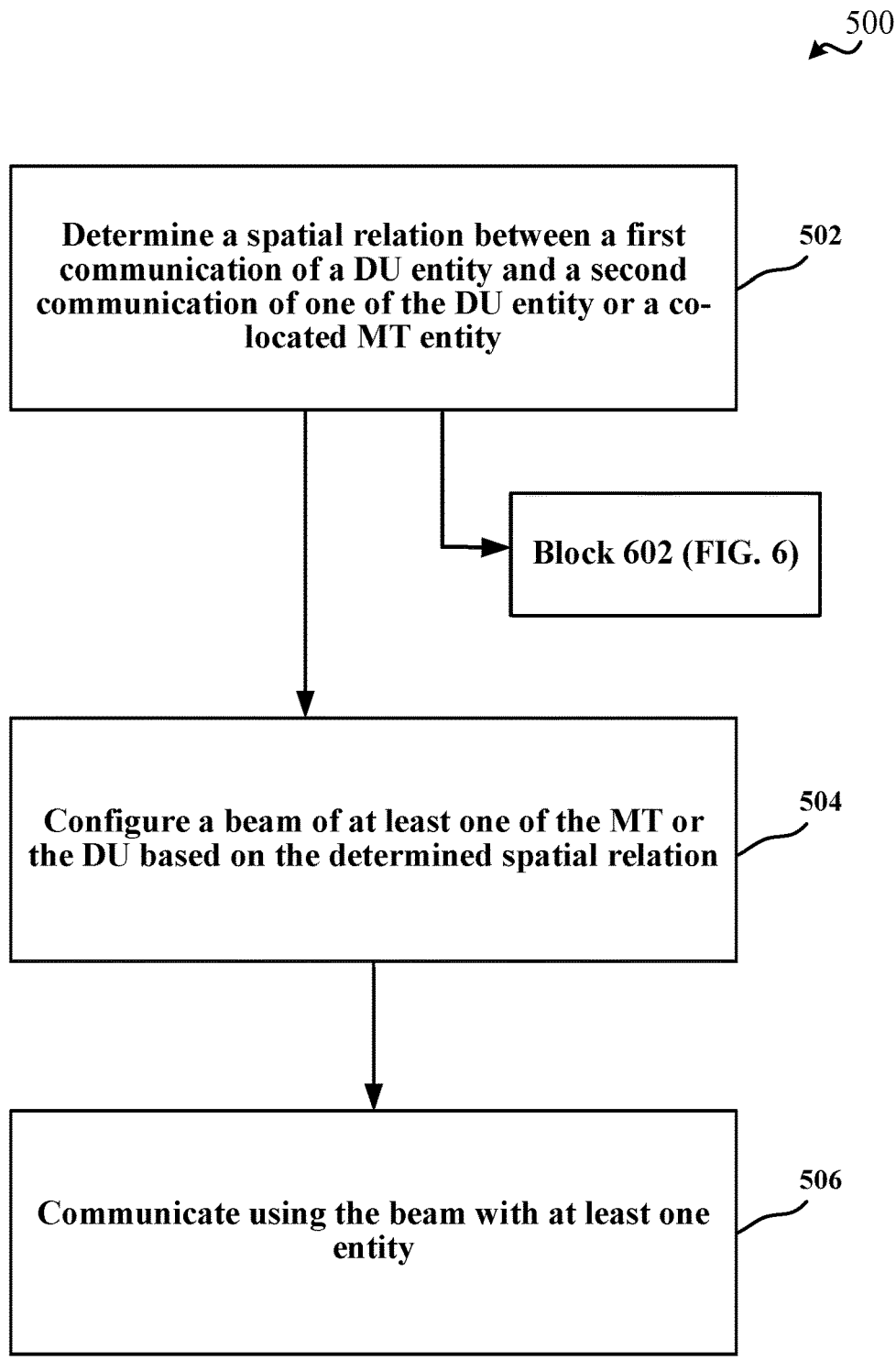
FIG. 5 is a flow chart illustrating an example of a method for wireless communications at a node such as an IAB node in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of a node acting as an IAB node, such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for beam configurations based on QCL indications.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 7. Similarly, the memory 316 may correspond to the memory described in connection with the base station in FIG. 7.

Further, FIG. 4 is a diagram of an uplink and downlink communication scheme in an IAB system 400, as described herein. In one example, the IAB system 400 may include an IAB node 404, which may be similar to or the same as the base station 102. The IAB system 400 may further include a parent node 402, a child node 406, and a UE 104. For example, in an IAB system, an IAB node 404 can transmit uplink data towards the parent-node 402, and receive the uplink data from the UE 104 and/or child node 406. The IAB node 404 may also transmit downlink data towards the child node 406, and receive the downlink data from the parent node 402.

In some aspects, the IAB node 404 may host two NR functions: (i) a MT 408, used to maintain the wireless backhaul connection towards an upstream IAB-node or IAB-donor, and (ii) a DU 410 to provide access connection to the UEs or the downstream MTs of other IAB-nodes. The DU 410 may connect to a CU hosted by the IAB-donor by means of the NR F1 interface running over the wireless backhaul link. Therefore, in the access of IAB nodes and donors there may be a coexistence of two interfaces, i.e., the Uu interface (e.g., between the UEs and the DU of the gNBs) and the aforementioned F1 interface.

The IAB node 404 may include the communicating component 242, which may be configured to determine a spatial relation between a first communication of a DU 410 entity and a second communication of one of the DU entity or a co-located MT 408 entity. The IAB node 404 may further configure a beam of at least one of the MT 408 or the DU 410 based on the determined spatial relation, and communicate using the beam with at least one entity.

The various nodes may communicate using a number of communication channels. For example, for a physical downlink control channel (PDCCH), a QCL may be configured for each control resource set (CORESET). In one aspect, QCL may be configured via a transmission configuration indicator (TCI) state such as when a radio resource control (RRC) configures multiple TCI states for each CORESET, such that a media access control (MAC) indicates which TCI state is activated. In another aspect, if no QCL is configured, the CORESET may be determined to be QCLed with a synchronization signal block (SSB).

In another example, for a physical downlink shared channel (PDSCH), a demodulation reference signal (DMRS) for PDSCH, and for PDSCH using the same precoding may be implemented. The downlink control information (DCI) may be indicate TCI state (i.e., one out of 'M' configured states). TCI may indicate QCL relation between DMRS of PDSCH (i.e., DMRS port groups) and channel state information reference signal (CSI-RS) or SSB. If the TCI does not indicate the QCL relation or if a scheduling offset (i.e., between PDCCH and PDSCH) is less than 'N' slots, then the same TCI state as the DCI may be determined.

In a further example, for a physical uplink control channel, an indicator such as spatialRelatoinInfo, which may be QCLed with SSB, CSI-RS or SRS may be provided. In another example, for a physical uplink shared channel, a DMRS for PUSCH and PUSCH using the same precoding may be implemented. Additionally, PUSCH may be provided with codebook-based precoding such that a DCI provides precoding information and antenna ports (i.e., antenna port of a configured SRS) via scheduling request indicator (SRI). For non-codebook-based implementations, the same precoding device may be used for a configured SRS (i.e., indicated via SRI).

A sounding reference signal (SRS) may be transmitted on the uplink. For instance, a spatialRelationInfo may be a reference signal corresponding to an SSB, CSI-RS, or SRS. If the SRS is periodic, the reference CSI-RS may be periodic or semi-persistent. In this case, the reference SRS may be periodic. If the SRS is semi-persistent, the CSI-RS may be periodic or semi-persistent. In this case, the reference SRS may be periodic or semi-persistent. If the SRS is aperiodic, the CSI-RS may be periodic or semi-persistent. In this case, the reference SRS may be periodic, semi-persistent, or aperiodic. If no spatialRelationInfo is provided, then the UE may sweep multiple uplink beam directions.

The present aspects provide implementations for QCL indications in IAB systems. Specifically, an IAB-node may have one or more MTs, and one or more DUs, where each DU may have one or more cells/sectors. Each entity (i.e., MT and/or cell) may also have one or more TRPs. The signals that are transmitted by or received by different entities (i.e., or their TRPs) may be QCLed and/or spatially related.

In some aspects, a number of QCL indications may be provided. For example, QCL Type-A may indicate a Doppler shift, Doppler spread, average delay, and a delay spread. QCL Type-B may indicate a Doppler shift and Doppler spread. QCL Type-C may indicate a Doppler shift and average delay. QCL Type-D may indicate a spatial reception parameter.

In one example, a transmission (i.e., uplink) of an IAB-node MT may be spatially related to transmissions (i.e., downlink) of a collocated IAB-node DU cell. An uplink transmission may be configured with a spatialRelationInfo that provides an SSB-index and a CSI-RS-index of a collocated IAB-node DU cell. In some aspects, the configuration may be extendable to different TRPs of the cell (e.g., TRP index may be indicated in this case). An uplink transmission may further be configured with an spatialRelationInfo that provides an index of an SSB transmitted by a collocated IAB-node DU cell within an SSB transmission configuration (STC) window, which may be indicated based on an SSB index along with a center frequency or an SSB index along with an STC configuration index.

In a further example, a reception (i.e., downlink) of an IAB-node MT may be spatially related, or QCLed, to transmissions of a collocated IAB-node DU cell. An MT may be configured to receive a downlink signal or perform a measurement using a beam/precoding that may be used for transmission/reception of other communications. In some aspects, an SSB-index and CSI-RS-index of a collocated IAB-node DU cell may be indicated, and may be extendable to different TRPs of cell (e.g., TRP index may be indicated in this case). Further, an index of an SSB transmitted by a collocated IAB-node DU cell within an STC window may be provided.

In another example, a DU cell may be configured (e.g., by a CU or a parent-node) to transmit a downlink signal using a beam/precoding that may be used for transmission/reception of other communications. In some aspects, an SSB-index and CSI-RS-index of the DU cell may be provided, and may be extendable to different TRPs of cell (i.e., TRP index may be indicated). An index of an SSB transmitted by the cell within an STC window may also be implemented. Further, an SRS-index of a collocated MT may be provided and may be extendable to different TRPs of the MT.

In a further example, a DU cell may be configured (e.g., by a CU or a parent-node) to receive an uplink signal or perform a measurement using a beam/precoding that may be used for transmission/reception of other communications. In some aspects, an SSB-index, CSI-RS-index of the DU cell may be determined and extendable to different TRPs of cell (TRP index indicated). Additionally, an index of an SSB transmitted by the cell within an STC window may be determined, as well as an SRS-index of a collocated MT.

Figure 6:
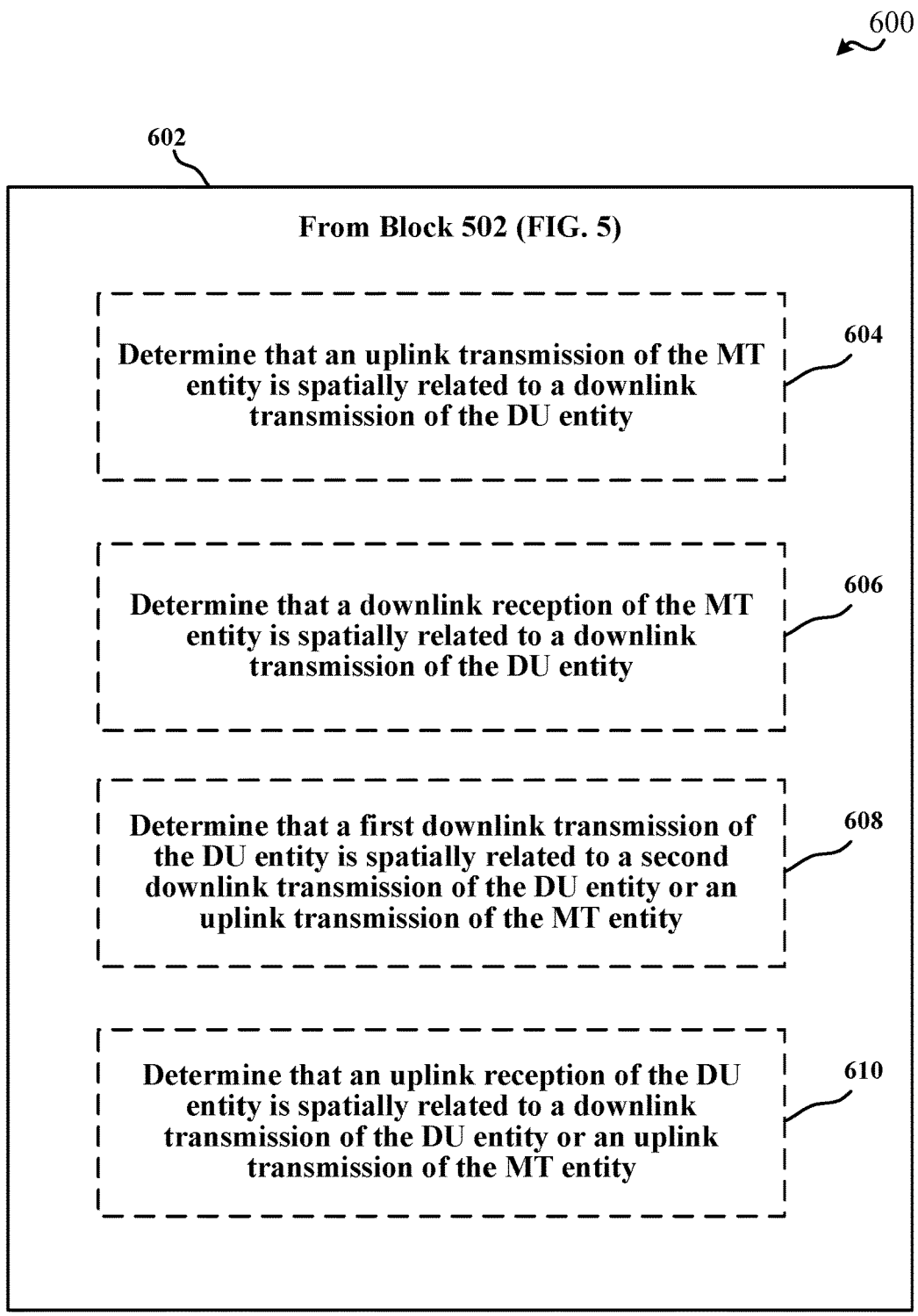
FIG. 6 is a flow chart illustrating an example of a method for wireless communications at a node such as an IAB node in accordance with various aspects of the present disclosure.

Turning now to FIGS. 5 and 6, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 1, 2, 4 and/or 7, as described herein, a specially-programmed processor, a processor executing specially-programmed software or computer-readable media, or by any other combination of a hardware component and/or a software component capable of performing the described actions or functions.

FIGS. 5 and 6 illustrate a flow chart of an example of a method 500 for wireless communication at a node, which may be an IAB node. In an example, a base station 102 can perform the functions described in method 500 using one or more of the components described in FIGS. 1, 2, 4, and 7.

At block 502, the method 500 may determine a spatial relation between a first communication of a DU entity and a second communication of one of the DU entity or a co-located MT entity. In an aspect, the communicating component 242, e.g., in conjunction with processor(s) 212, memory 216, and/or transceiver 202, may be configured to determine a spatial relation between a first communication of a DU entity and a second communication of one of the DU entity or a co-located MT entity. In one example, the data can be associated with a priority level. Thus, the base station 102, the processor(s) 212, the communicating component 242 or one of its subcomponents may define the means for determining a spatial relation between a first communication of a DU entity and a second communication of one of the DU entity or a co-located MT entity. In some aspects, as further described below, block 402 may continue to block 602 (FIG. 6).

At block 504, the method 500 may configure a beam of at least one of the MT or the DU based on the determined spatial relation. In an aspect, the communicating component 242, e.g., in conjunction with processor(s) 212, memory 216, and/or transceiver 202, may be configured to configure a beam of at least one of the MT or the DU based on the determined spatial relation. Thus, the base station 102, the processor(s) 212, the communicating component 242 or one of its subcomponents may define the means for configuring a beam of at least one of the MT or the DU based on the determined spatial relation.

At block 506, the method 500 may communicate using the beam with at least one entity. In an aspect, the communicating component 242, e.g., in conjunction with processor(s) 212, memory 216, and/or transceiver 202, may be configured to communicate using the beam with at least one entity. Thus, the base station 102, the processor(s) 212, the communicating component 242 or one of its subcomponents may define the means for communicating using the beam with at least one entity.

At block 602, determination of the spatial relation may correspond to any one of blocks 604, 606, 608, or 610.

For example, at block 604, determining the spatial relation may include determining that an uplink transmission of the MT entity is spatially related to a downlink transmission of the DU entity. In some aspects, configuring the beam includes configuring the uplink transmission of the MT entity with a spatial relation information indication including at least one of a synchronization signal block (SSB) index associated with the DU entity, or a channel state information reference signal (CSI-RS) index associated with the DU entity.

In some aspects, at least one of the SSB index or the CSI-RS index may be associated with different transmission reception points (TRPs) of the DU entity.

In some aspects, the spatial relation information indication further includes an index of an SSB transmitted by the DU entity within an SSB transmission configuration (STC) window.

In some aspects, the index of the SSB corresponds to at least one of a first SSB index with a center frequency or a second SSB index with an STC configuration window.

For example, at block 606, determining the spatial relation may include determining that a downlink reception of the MT entity is spatially related to a downlink transmission of the DU entity. In some aspects, configuring the beam includes configuring the downlink transmission of the MT entity with a spatial relation information indication including at least one of a SSB index associated with the DU entity, or a CSI-RS index associated with the DU entity.

In some aspects, at least one of the SSB index or the CSI-RS index may be associated with different TRPs of the DU entity.

In some aspects, the spatial relation information indication further includes an index of an SSB transmitted by the DU entity within an SSB transmission configuration (STC) window.

For example, at block 608, determining the spatial relation may include determining that a first downlink transmission of the DU entity is spatially related to a second downlink transmission of the DU entity or an uplink transmission of the MT entity. In some aspects, configuring the beam includes configuring the first downlink transmission of the DU entity with a spatial relation information indication including at least one of a SSB index associated with the DU entity, or a CSI-RS index associated with the DU entity.

In some aspects, the spatial relation includes receiving a beam configuration indication from a central unit (CU) or a parent IAB entity.

In some aspects, at least one of the SSB index or the CSI-RS index are associated with different TRPs of the DU entity.

In some aspects, the spatial relation information indication further includes at least one of an index of an SSB transmitted by the DU entity within an STC window In some aspects, configuring the beam may include configuring the downlink transmission of the DU entity with a spatial relation information indication including a sounding reference signal (SRS) index of the MT entity.

For example, at block 610, determining the spatial relation may include determining that an uplink reception of the DU entity is spatially related to a downlink transmission of the DU entity or an uplink transmission of the MT entity. In some aspects, configuring the beam includes configuring the uplink reception of the DU entity with a spatial relation information indication including at least one of a SSB index associated with the DU entity, or a CSI-RS index associated with the DU entity.

In some aspects, determining the spatial relation may include receiving a beam configuration indication from a CU or a parent IAB entity.

In some aspects, at least one of the SSB index or the CSI-RS index may be associated with different TRPs of the DU entity.

In some aspects, the spatial relation information indication further includes at least one of an index of an SSB transmitted by the DU entity within an STC window.

In some aspects, configuring the beam may include configuring the downlink transmission of the DU entity with a spatial relation information indication including a sounding reference signal (SRS) index of the MT entity.

In some aspects, the spatial relation may correspond to a quasi-co-location of the MT entity and the DU entity.

In some aspects, communicating using the beam with at least one entity comprises at least one of the following an uplink transmission by the MT entity, a downlink reception by the MT entity, a downlink transmission by the DU entity, an uplink reception by the DU entity, or measuring one or more signals by one of the MT or DU entities.

Figure 7:
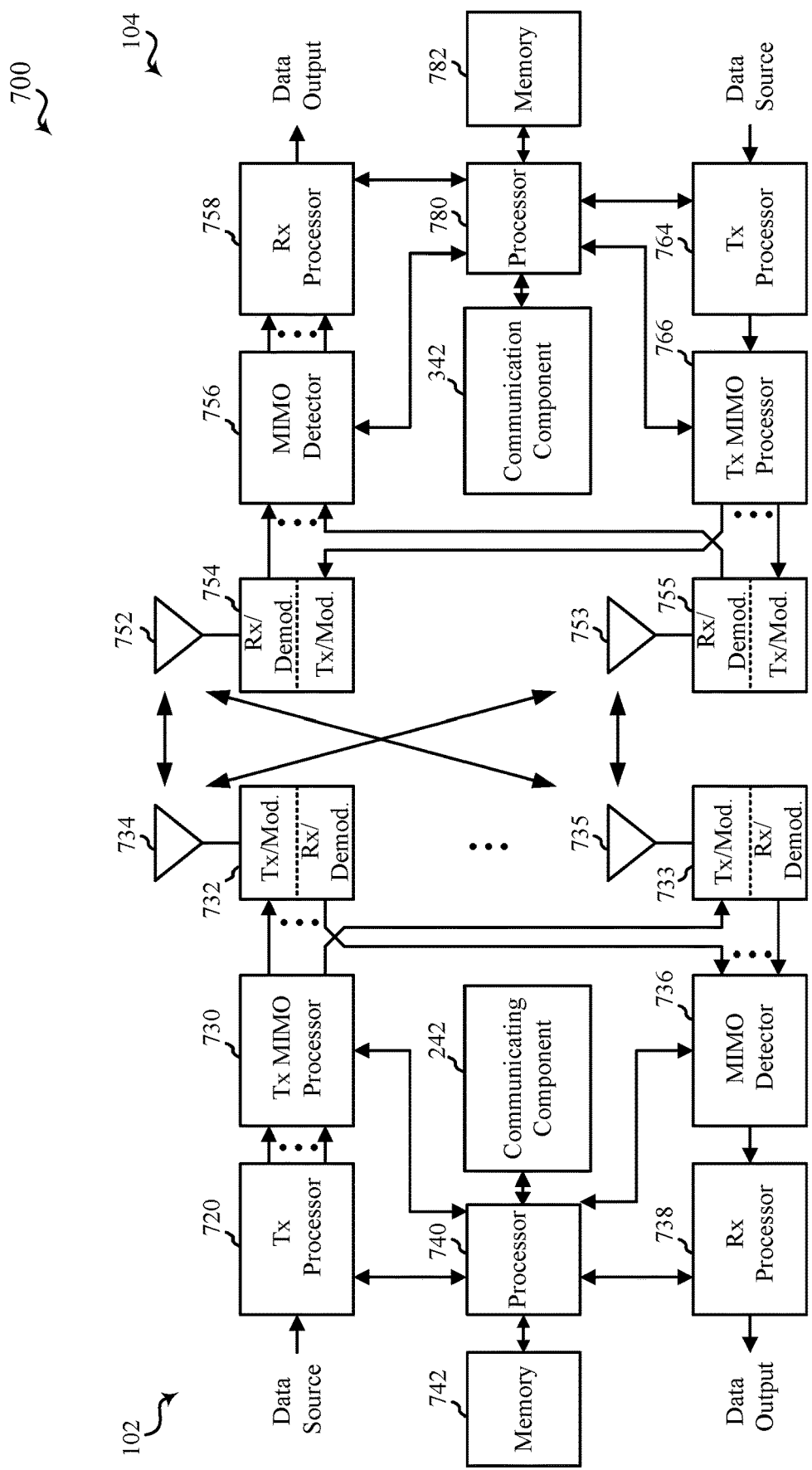
FIG. 7 is a block diagram illustrating an example of a MIMO communication system including a base station and a UE, in accordance with various aspects of the present disclosure.

FIG. 7 is a block diagram of a MIO communication system 700 including a base station 102, which may be acting as an IAB node or a parent node, and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 980, or memory 982.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

SOME ADDITIONAL EXAMPLES

The aspects described herein additionally include one or more of the following implementation examples described in the following numbered clauses.

1. A method of wireless communications at an integrated access and backhaul (IAB) node, comprising:
   determining a spatial relation between a first communication of a distributed unit (DU) entity and a second communication of one of the DU entity or a co-located mobile termination (MT) entity;
   configuring a beam of at least one of the MT or the DU based on the determined spatial relation; and
   communicating using the beam with at least one entity.

2. The method of clause 1, wherein determining the spatial relation includes determining that an uplink transmission of the MT entity is spatially related to a downlink transmission of the DU entity, and
   wherein configuring the beam includes configuring the uplink transmission of the MT entity with a spatial relation information indication including at least one of:
   a synchronization signal block (SSB) index associated with the DU entity, or
   a channel state information reference signal (CSI-RS) index associated with the DU entity.

3. The method of any preceding clause, wherein at least one of the SSB index or the CSI-RS index are associated with different transmission reception points (TRPs) of the DU entity.

4. The method of any preceding clause, wherein the spatial relation information indication further includes an index of an SSB transmitted by the DU entity within an SSB transmission configuration (STC) window.

5. The method of any preceding clause, wherein the index of the SSB corresponds to at least one of a first SSB index with a center frequency or a second SSB index with an STC configuration window.

6. The method of any preceding clause, wherein determining the spatial relation includes determining that a downlink reception of the MT entity is spatially related to a downlink transmission of the DU entity, and
   wherein configuring the beam includes configuring the downlink transmission of the MT entity with a spatial relation information indication including at least one of:
   a synchronization signal block (SSB) index associated with the DU entity, or
   a channel state information reference signal (CSI-RS) index associated with the DU entity.

7. The method of any preceding clause, wherein at least one of the SSB index or the CSI-RS index are associated with different transmission reception points (TRPs) of the DU entity.

8. The method of any preceding clause, wherein the spatial relation information indication further includes an index of an SSB transmitted by the DU entity within an SSB transmission configuration (STC) window.

9. The method of any preceding clause, wherein determining the spatial relation includes determining that a first downlink transmission of the DU entity is spatially related to a second downlink transmission of the DU entity, and
   wherein configuring the beam includes configuring the first downlink transmission of the DU entity with a spatial relation information indication including at least one of:
   a synchronization signal block (SSB) index associated with the DU entity, or
   a channel state information reference signal (CSI-RS) index associated with the DU entity.

10. The method of any preceding clause, wherein determining the spatial relation includes receiving a beam configuration indication from a central unit (CU) or a parent IAB entity.

11. The method of any preceding clause, wherein at least one of the SSB index or the CSI-RS index are associated with different transmission reception points (TRPs) of the DU entity.

12. The method of any preceding clause, wherein the spatial relation information indication further includes at least one of: an index of an SSB transmitted by the DU entity within an SSB transmission configuration (STC) window.

13. The method of any preceding clause, wherein determining the spatial relation includes determining that a downlink transmission of the DU entity is spatially related to an uplink transmission of the MT entity.

14. The method of any preceding clause, wherein configuring the beam includes configuring the downlink transmission of the DU entity with a spatial relation information indication including a sounding reference signal (SRS) index of the MT entity.

15. The method of any preceding clause, wherein determining the spatial relation includes determining that an uplink reception of the DU entity is spatially related to a downlink transmission of the DU entity, and wherein configuring the beam includes configuring the uplink reception of the DU entity with a spatial relation information indication including at least one of:
 a synchronization signal block (SSB) index associated with the DU entity, or
 a channel state information reference signal (CSI-RS) index associated with the DU entity.

16. The method of any preceding clause, wherein determining the spatial relation includes receiving a beam configuration indication from a central unit (CU) or a parent IAB entity.

17. The method of any preceding clause, wherein at least one of the SSB index or the CSI-RS index are associated with different transmission reception points (TRPs) of the DU entity.

18. The method of any preceding clause, wherein the spatial relation information indication further includes at least one of: an index of an SSB transmitted by the DU entity within an SSB transmission configuration (STC) window.

19. The method of any preceding clause, wherein determining the spatial relation includes determining that an uplink reception of the DU entity is spatially related to an uplink transmission of the MT entity.

20. The method of any preceding clause, wherein configuring the beam includes configuring the uplink reception of the DU entity with a spatial relation information indication including a sounding reference signal (SRS) index of the MT entity.

21. The method of any preceding clause wherein the spatial relation corresponds to a quasi-co-location of the MT entity and the DU entity.

22. The method of any preceding clause, wherein communicating using the beam with at least one entity comprises at least one of:
 an uplink transmission by the MT entity,
 a downlink reception by the MT entity,
 a downlink transmission by the DU entity,
 an uplink reception by the DU entity, or
 measuring one or more signals by one of the MT or DU entities.

23. An apparatus corresponding to an integrated access and backhaul (IAB) node for wireless communication, comprising:
 a transceiver;
 a memory configured to store instructions; and
 at least one processor communicatively coupled with the transceiver and the memory, wherein the at least one processor is configured to:
  determine a spatial relation between a first communication of a distributed unit (DU) entity and a second communication of one of the DU entity or a co-located mobile termination (MT) entity;
  configure a beam of at least one of the MT or the DU based on the determined spatial relation; and
  communicate using the beam with at least one entity.

24. The apparatus of claim 23, wherein to determine the spatial relation, the at least one processor is further configured to determine that an uplink transmission of the MT entity is spatially related to a downlink transmission of the DU entity, and wherein to configure the beam, the at least one processor is further configured to configure the uplink transmission of the MT entity with a spatial relation information indication including at least one of:
 a synchronization signal block (SSB) index associated with the DU entity, or
 a channel state information reference signal (CSI-RS) index associated with the DU entity.

25. The apparatus of any preceding clause, wherein to determine the spatial relation, the at least one processor is further configured to determine that a downlink reception of the MT entity is spatially related to a downlink transmission of the DU entity, and wherein to configure the beam, the at least one processor is further configured to configure the downlink transmission of the MT entity with a spatial relation information indication including at least one of:
 a synchronization signal block (SSB) index associated with the DU entity, or
 a channel state information reference signal (CSI-RS) index associated with the DU entity.

26. The apparatus of any preceding clause, wherein to determine the spatial relation, the at least one processor is further configured to determine that a first downlink transmission of the DU entity is spatially related to a second downlink transmission of the DU entity, and wherein to configure the beam, the at least one processor is further configured to configure the first downlink transmission of the DU entity with a spatial relation information indication including at least one of:
 a synchronization signal block (SSB) index associated with the DU entity, or
 a channel state information reference signal (CSI-RS) index associated with the DU entity.

27. The apparatus of any preceding clause, wherein to determine the spatial relation, the at least one processor is further configured to determine that a downlink transmission of the DU entity is spatially related to an uplink transmission of the MT entity.

28. The apparatus of any preceding clause, wherein to determine the spatial relation, the at least one processor is further configured to determine that an uplink reception of the DU entity is spatially related to a downlink transmission of the DU entity, and wherein to configure the beam, the at least one processor is further configured to configure the uplink reception of the DU entity with a spatial relation information indication including at least one of:
 a synchronization signal block (SSB) index associated with the DU entity, or
 a channel state information reference signal (CSI-RS) index associated with the DU entity.

29. An apparatus corresponding to an integrated access and backhaul (IAB) node for wireless communication, comprising:
 means for determining a spatial relation between a first communication of a distributed unit (DU) entity and a second communication of one of the DU entity or a co-located mobile termination (MT) entity;

means for configuring a beam of at least one of the MT or the DU based on the determined spatial relation; and means for communicating using the beam with at least one entity.

30. A non-transitory computer-readable medium storing computer code executable by a processor for wireless communications at a network entity comprising code for:

determining a spatial relation between a first communication of a distributed unit (DU) entity and a second communication of one of the DU entity or a co-located mobile termination (MT) entity;

configuring a beam of at least one of the MT or the DU based on the determined spatial relation; and communicating using the beam with at least one entity.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at an integrated access and backhaul (IAB) node, comprising:

determining a spatial relation between a first communication of a distributed unit (DU) entity and a second communication of one of the DU entity or a co-located mobile termination (MT) entity;

configuring a beam of at least one of the MT or the DU based on the determined spatial relation; and communicating using the beam with at least one entity.

2. The method of claim 1, wherein determining the spatial relation includes determining that an uplink transmission of the MT entity is spatially related to a downlink transmission of the DU entity, and wherein configuring the beam includes configuring the uplink transmission of the MT entity with a spatial relation information indication including at least one of:
 a synchronization signal block (SSB) index associated with the DU entity, or
 a channel state information reference signal (CSI-RS) index associated with the DU entity.

3. The method of claim 2, wherein at least one of the SSB index or the CSI-RS index are associated with different transmission reception points (TRPs) of the DU entity.

4. The method of claim 2, wherein the spatial relation information indication further includes an index of an SSB transmitted by the DU entity within an SSB transmission configuration (STC) window.

5. The method of claim 4, wherein the index of the SSB corresponds to at least one of a first SSB index with a center frequency or a second SSB index with an STC configuration window.

6. The method of claim 1, wherein determining the spatial relation includes determining that a downlink reception of the MT entity is spatially related to a downlink transmission of the DU entity, and wherein configuring the beam includes configuring the downlink transmission of the MT entity with a spatial relation information indication including at least one of:
 a synchronization signal block (SSB) index associated with the DU entity, or
 a channel state information reference signal (CSI-RS) index associated with the DU entity.

7. The method of claim 6, wherein at least one of the SSB index or the CSI-RS index are associated with different transmission reception points (TRPs) of the DU entity.

8. The method of claim 6, wherein the spatial relation information indication further includes an index of an SSB transmitted by the DU entity within an SSB transmission configuration (STC) window.

9. The method of claim 1, wherein determining the spatial relation includes determining that a first downlink transmission of the DU entity is spatially related to a second downlink transmission of the DU entity, and wherein configuring the beam includes configuring the first downlink transmission of the DU entity with a spatial relation information indication including at least one of:
 a synchronization signal block (SSB) index associated with the DU entity, or
 a channel state information reference signal (CSI-RS) index associated with the DU entity.

10. The method of claim 9, wherein determining the spatial relation includes receiving a beam configuration indication from a central unit (CU) or a parent IAB entity.

11. The method of claim 9, wherein at least one of the SSB index or the CSI-RS index are associated with different transmission reception points (TRPs) of the DU entity.

12. The method of claim 9, wherein the spatial relation information indication further includes at least one of:
 an index of an SSB transmitted by the DU entity within an SSB transmission configuration (STC) window.

13. The method of claim 1, wherein determining the spatial relation includes determining that a downlink transmission of the DU entity is spatially related to an uplink transmission of the MT entity.

14. The method of claim 13, wherein configuring the beam includes configuring the downlink transmission of the DU entity with a spatial relation information indication including a sounding reference signal (SRS) index of the MT entity.

15. The method of claim 1, wherein determining the spatial relation includes determining that an uplink reception of the DU entity is spatially related to a downlink transmission of the DU entity, and wherein configuring the beam includes configuring the uplink reception of the DU entity with a spatial relation information indication including at least one of:
 a synchronization signal block (SSB) index associated with the DU entity, or
 a channel state information reference signal (CSI-RS) index associated with the DU entity.

16. The method of claim 15, wherein determining the spatial relation includes receiving a beam configuration indication from a central unit (CU) or a parent IAB entity.

17. The method of claim 15, wherein at least one of the SSB index or the CSI-RS index are associated with different transmission reception points (TRPs) of the DU entity.

18. The method of claim 15, wherein the spatial relation information indication further includes at least one of:
 an index of an SSB transmitted by the DU entity within an SSB transmission configuration (STC) window.

19. The method of claim 1, wherein determining the spatial relation includes determining that an uplink reception of the DU entity is spatially related to an uplink transmission of the MT entity.

20. The method of claim 19, wherein configuring the beam includes configuring the uplink reception of the DU entity with a spatial relation information indication including a sounding reference signal (SRS) index of the MT entity.

21. The method of claim 1, wherein the spatial relation corresponds to a quasi-co-location of the MT entity and the DU entity.

22. The method of claim 1, wherein communicating using the beam with at least one entity comprises at least one of:
 an uplink transmission by the MT entity,
 a downlink reception by the MT entity,
 a downlink transmission by the DU entity,
 an uplink reception by the DU entity, or
 measuring one or more signals by one of the MT or DU entities.

23. An apparatus corresponding to an integrated access and backhaul (TAB) node for wireless communication, comprising:
 a transceiver;
 a memory configured to store instructions; and
 at least one processor communicatively coupled with the transceiver and the memory, wherein the at least one processor is configured to:
  determine a spatial relation between a first communication of a distributed unit (DU) entity and a second communication of one of the DU entity or a co-located mobile termination (MT) entity;
  configure a beam of at least one of the MT or the DU based on the determined spatial relation; and
  communicate using the beam with at least one entity.

24. The apparatus of claim 23, wherein to determine the spatial relation, the at least one processor is further configured to determine that an uplink transmission of the MT entity is spatially related to a downlink transmission of the DU entity, and wherein to configure the beam, the at least one processor is further configured to configure the uplink transmission of the MT entity with a spatial relation information indication including at least one of:

a synchronization signal block (SSB) index associated with the DU entity, or a channel state information reference signal (CSI-RS) index associated with the DU entity.

25. The apparatus of claim 23, wherein to determine the spatial relation, the at least one processor is further configured to determine that a downlink reception of the MT entity is spatially related to a downlink transmission of the DU entity, and wherein to configure the beam, the at least one processor is further configured to configure the downlink transmission of the MT entity with a spatial relation information indication including at least one of:

a synchronization signal block (SSB) index associated with the DU entity, or a channel state information reference signal (CSI-RS) index associated with the DU entity.

26. The apparatus of claim 23, wherein to determine the spatial relation, the at least one processor is further configured to determine that a first downlink transmission of the DU entity is spatially related to a second downlink transmission of the DU entity, and wherein to configure the beam, the at least one processor is further configured to configure the first downlink transmission of the DU entity with a spatial relation information indication including at least one of:

a synchronization signal block (SSB) index associated with the DU entity, or a channel state information reference signal (CSI-RS) index associated with the DU entity.

27. The apparatus of claim 23, wherein to determine the spatial relation, the at least one processor is further configured to determine that a downlink transmission of the DU entity is spatially related to an uplink transmission of the MT entity.

28. The apparatus of claim 23, wherein to determine the spatial relation, the at least one processor is further configured to determine that an uplink reception of the DU entity is spatially related to a downlink transmission of the DU entity, and wherein to configure the beam, the at least one processor is further configured to configure the uplink reception of the DU entity with a spatial relation information indication including at least one of:

a synchronization signal block (SSB) index associated with the DU entity, or a channel state information reference signal (CSI-RS) index associated with the DU entity.

29. An apparatus corresponding to an integrated access and backhaul (IAB) node for wireless communication, comprising:

means for determining a spatial relation between a first communication of a distributed unit (DU) entity and a second communication of one of the DU entity or a co-located mobile termination (MT) entity;

means for configuring a beam of at least one of the MT or the DU based on the determined spatial relation; and means for communicating using the beam with at least one entity.

30. A non-transitory computer-readable medium storing computer code executable by a processor for wireless communications at a network entity comprising code for:

determining a spatial relation between a first communication of a distributed unit (DU) entity and a second communication of one of the DU entity or a co-located mobile termination (MT) entity;

configuring a beam of at least one of the MT or the DU based on the determined spatial relation; and communicating using the beam with at least one entity.

\* \* \* \* \*